United States Patent [19]

Sawaki

[11] Patent Number: 5,778,319
[45] Date of Patent: Jul. 7, 1998

[54] MOBILE STATION AND RADIO COMMUNICATION SYSTEM EMPLOYING MULTI-CHANNEL ACCESS

[75] Inventor: Takashi Sawaki, Kawasaki, Japan

[73] Assignee: Fujitsu Limited, Kanagawa, Japan

[21] Appl. No.: 723,024

[22] Filed: Sep. 30, 1996

[30] Foreign Application Priority Data

Feb. 26, 1996 [JP] Japan ................................. 8-038063

[51] Int. Cl.$^6$ ............................................................ H04Q 7/20
[52] U.S. Cl. ............................ 455/452; 455/560; 370/337
[58] Field of Search ................................... 370/329, 336, 370/337, 345, 347; 455/450–453, 62, 422, 509, 517, 560, 561

[56] References Cited

U.S. PATENT DOCUMENTS 4,763,322  8/1988  Eizenhöfer .................. 370/347
5,504,939  4/1996  Mayrand et al. ............ 455/450

FOREIGN PATENT DOCUMENTS 2-119327   5/1990   Japan.
6-311555  11/1994   Japan.

Primary Examiner—Nguyen Vo
Attorney, Agent, or Firm—Helfgott & Karas, PC.

[57] ABSTRACT

A radio communication system comprises a parent station forming a radio zone, and one or a plurality of child stations located within the radio zone. The parent station includes an assign unit for discriminates a type of call based on a call processing procedure with respect to each call generated in the child stations, and out of radio channels forming the radio zone, making a general assignment of a number of free radio channels adapted to the discriminated type of call, based on a radio channel setup control procedure, and a talk path setup unit for setting up talk paths connecting the parent station with another party in parallel via the individual radio channels assigned by the assign unit based on the call processing procedure, with respect to the individual calls. On the other hand, each of the child stations comprises a completed call identifying unit for exchanging a line signal with the other party via one representative channel out of the radio channels assigned by the assign unit and the talk path which is set up by the talk path setup unit in correspondence with the representative channel, and identifying a completed call of a child station to which the completed call identifying unit belongs based on a line signal exchange procedure, and a talk control unit for sending or receiving a talk signal of the completed call which is identified by the completed call identifying unit via all of the radio channels assigned by the assign unit.

8 Claims, 14 Drawing Sheets

F I G . 2
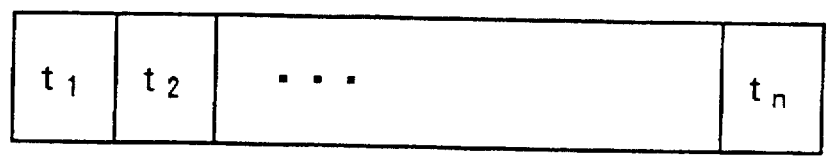

5,778,319

1

MOBILE STATION AND RADIO COMMUNICATION SYSTEM EMPLOYING MULTI-CHANNEL ACCESS

BACKGROUND OF THE INVENTION

The present invention generally relates to mobile stations and radio communication systems, and more particularly to a mobile station and a radio communication system employing multi-channel access.

Recently, the market of the mobile communication systems has become more liberalized, and the number of subscribers has increased rapidly due to competition and entry of many communication industries in the market. Hence, in order to provide a service by positively assigning a radio channel to a call that is generated during a busiest time of the mobile communication system, techniques such as using radio frequencies which are finite resources in common among a plurality of mobile stations under the TDMA system or reusing the radio frequencies in a plurality of radio zones.

In addition, with respect to the for of communication services to be provided by the mobile communication system, there are demands to flexibly cope with developments in multimedia by transmitting a plurality of various information in real-time in order to realize high-speed transmission of image and the like using ISDN or the like.

FIG. 1 is a system block diagram showing an example of the construction of a conventional mobile communication system.

In FIG. 1, a radio base station $91_1$ is coupled to a public network (not shown) via a radio control station 92 and a switching station 93, and a mobile station $94_1$ is located within a radio zone which is formed by the radio base station $91_1$. Radio base stations $91_2$ through $91_N$ are connected to the radio control station 92 in addition to the radio base station $91_1$, and mobile stations $94_2$ through $94_n$ are located within the above radio zone in addition to the mobile station $94_1$, however, illustration of the radio base stations $91_2$ through $91_N$ and the mobile stations $94_2$ through $94_n$ is omitted in FIG. 1 for the sake of convenience.

In the radio base station $91_1$, a power supply terminal of an antenna $95_1$ is connected to an antenna terminal of a transmitter/receiver $96_1$, and this transmitter/receiver $96_1$ is coupled to a corresponding port of the radio control station 92 via a TDMA controller $97_1$ and a network interface $98_1$ which are connected in series. Control inputs and outputs of the transmitter/receiver $96_1$, the TDMA controller $97_1$ and the network interface $98_1$ are connected to corresponding input/output ports of a processor $99_1$, and a communication port of this processor $99_1$ is connected to a corresponding communication port of the radio control station 92.

In the mobile station $94_1$, an output of a handset $100_1$ is connected to an encoding input of a coder/decoder (codec) $101_1$, and an encoded output of the codec $101_1$ is coupled to a modulating input of a transmitter/receiver $103_1$ via a TDMA controller $102_1$. An antenna terminal of the transmitter/receiver $103_1$ is connected to a power supply terminal of an antenna $104_1$, and a demodulated output of the transmitter/receiver $103_1$ is coupled to a decoding input of the codec $101_1$ via the TDMA controller $102_1$. A decoded output of the codec $101_1$ is connected to an input of the handset $100_1$, and a node between the codec $101_1$ and the TDMA controller $102_2$ is connected to an external interface $105_1$. A control input of the codec $101_1$, and control inputs and outputs of the TDMA controller 102, the transmitter/receiver $103_1$ and the external interface $105_1$ are connected to corresponding ports of a processor $106_1$.

2

In the mobile communication system having the above described construction, the transmitter/receiver $96_1$ of the radio base station $91_1$ forms a radio zone via the antenna $95_1$ under synchronous control of the TDMA controller $97_1$. A frame made up of time slots $t_1$ through $t_n$ shown in FIG. 2 is used as a transmission unit in this radio zone.

When a call is generated and this call has as its destination the mobile station $94_1$ which is located within the above radio zone, the switching station 93 sends a "paging request" which requests ringing of the mobile station $94_1$ to the radio control station 92, as indicated by (1) in FIG. 3. Then, the radio control station 92 relays this "paging request" to the radio base stations $91_1$ through $91_N$, as indicated by (2) in FIG. 3.

In the following description, messages such as the "paging request" that are exchanged among the switching station 93, the radio control station 92, the radio base stations $91_1$ through $91_N$ and the mobile stations $94_1$ through $94_n$ via radio lines or other communication links will be identified by with brackets on both sides of the name for the sake of convenience.

In the following description, only the radio base station $91_1$ out of the radio base stations $91_1$ through $91_N$ will be described for the sake of convenience. When the processor $99_1$ of the radio base station $91_1$ recognizes the paging request, the processor $99_1$ sends a "selective paging instruction" which includes an identifier of the mobile station indicated by the "paging request" to a predetermined control channel out of the radio channels formed under the synchronous control of the TDMA controller $97_1$ via the transmitter/receiver $96_1$ and the antenna $95_1$, as indicated by (3) in FIG. 3.

On the other hand, in the mobile station $94_1$ the processor $106_1$ receives the "selective paging instruction" via the antenna $104_1$ and the transmitter/receiver $103_1$ under the synchronous control of the TDMA controller $102_1$, and discriminates whether or not the identifier included in this "selective paging instruction" indicates the mobile station $94_1$ to which the processor $106_1$ belongs, as indicated by (4) in FIG. 3. In addition, when the discrimination result indicates that the identifier indicates the mobile station $94_1$ the processor $106_1$ generates a "paged radio state report" which includes the identifier of the mobile station $94_1$ to which the processor $106_1$ belongs, and sends this "paged radio state report" to the radio base station $91_1$ via the transmitter/receiver $103_1$ and the antenna $104_1$ under the synchronous control of the TDMA controller $102_1$, as indicated by (5) in FIG. 3.

The radio base station $91_1$ converts the "paged radio state report" into a "paging response" which includes the above described identifier, and relays the "paging response" to the radio control station 92, as indicated by (6) in FIG. 3. The radio control station 92 relays the "paging response" to the switching station 93, as indicated by (7) in FIG. 3.

When the switching station 93 recognizes this "paging response", the switching station 93 identifies a call corresponding to the identifier included in the "paging response", and generates a "channel assign request" which includes the identifier, as indicated by (8) in FIG. 3. Furthermore, the switching station 93 sends the "channel assign request" to the radio control station 92, as indicated by (9) in FIG. 3.

When the radio control station 92 recognizes the "channel assign request", the radio control station 92 generates a "level measure request" which requests measurement of a received electric field intensity in order to judge out of radio channels (hereinafter referred to as "talk channels") which are free at the time a talk channel having a best communicating condition, and sends this "level measure request to the subordinate base station $91_1$, as indicated by (10) in FIG. 3.

At the radio base station $91_1$, the processor $99_1$ sends the "level measure request" similarly to the "selective paging request" described above, as indicated by (11) in FIG. 3.

In the mobile station $94_1$, when the processor $106_1$ receives the "level measure request" similarly to the "selective paging instruction" described above, the processor $106_1$ measures the electric field intensity via the transmitter/receiver $103_1$ with respect to the talk channel indicated by the "level measure request" and corresponding to one of the time slots shown in FIG. 2, and generates a "level measure response" which includes a measured value of the electric field intensity and the identifier of the mobile station $94_1$ to which the processor $106_1$ belongs, as indicated by (12) in FIG. 3. In addition, the processor $106_1$ sends this "level measure response" to the radio base station $91_1$ similarly to the "paged radio state report" described above, as indicated by (13) in FIG. 3.

At the radio base station $91_1$, the processor $99_1$ relays the "level measure response" to the radio control station 92 similarly to the "paging response" described above, as indicated by (14) in FIG. 3.

The radio control station 92 which receives the "level measure responses" from the subordinate radio base stations judges the "level measure response" with the largest measured value, and acquires a radio channel corresponding to the judgement result. Further, the radio control station 92 sends a "channel assign response" which indicates a corresponding relationship of the talk channels and the identifiers of the assigned mobile stations to the switching station 93, as indicated by (15) in FIG. 3.

When the switching station 93 recognizes the "channel assign response", the switching station 93 generates a "channel setup" which indicates the above described corresponding relationship and sends this "channel setup" to the radio control station 92, as indicated by (16) in FIG. 3. The radio control station 92 and the radio base station $91_1$ send the "channel setup" to the mobile station $94_1$ similarly to the "level measure request" described above, as indicated by (17) and (18) in FIG. 3.

At the mobile station $94_1$ the processor $106_1$ notifies a talk channel indicated by the "channel setup" to the TDMA controller $102_1$, and the TDMA controller $102_1$ achieves synchronization with respect to the talk channel. The processor $106_1$ also sends a synchronizing signal which is used as a reference for establishing synchronization under such a talk channel synchronization to the radio base station $91_1$, as indicated by (19) in FIG. 3.

The TDMA controller $102_1$ notifies the processor $106_1$ when the above described synchronization is established. When the processor $106_1$ recognizes this notification, the processor $106_1$ sends a "synchronization complete notification" which indicates the synchronization notification together with the identifier of the mobile station $94_1$ to which the processor $106_1$ belongs to the radio base station $91_1$, as indicated by (20) in FIG. 3.

At the radio base station $91_1$, when the processor $99_1$ receives and recognizes the "synchronization complete notification" and also recognizes that the synchronization is established by the TDMA controller $97_1$ based on the above described synchronizing signal, the processor $99_1$ notifies a "channel setup complete" to the radio controller 92, as indicated by (21) in FIG. 3.

The radio control station 92 notifies the "channel setup complete" to the switching station 93, as indicated by (22) in FIG. 3. When the switching station 93 recognizes the "channel setup complete", the switching station 93 forms a talk path to a calling source. In addition, the switching station 93 notifies "formation of a radio transmission path to a called destination complete" to the calling source, generates a "control channel release", and sends the "control channel release" to the radio control station 92.

When the radio control station 92 recognizes the "control channel release", the radio control station 92 releases a control channel which is used as a radio transmission path for the control information related to the applicable call, as indicated by (23) in FIG. 3.

Furthermore, the switching station 93 sends a "setup" which requests paging of the called destination to the mobile station $94_1$ via the radio control station 92 and the radio base station $91_1$, as indicated by (24) in FIG. 3.

At the mobile station $94_1$, when the processor $106_1$ recognizes the "setup" as the selective paging to the mobile station $94_1$ to which the processor $106_1$ belongs, the processor $106_1$ sends an "alert" to the calling source via the radio base station $91_1$, the radio control station 92 and the switching station 93 as a response with respect to this selective paging, as indicated by (25) in FIG. 3. In addition, the processor $106_1$ generates a ringing tone and waits while discriminating whether or not the handset $100_1$ is unhooked by the operator. When the processor $106_1$ recognizes that the handset $100_1$ is unhooked, the processor $100_1$ sends a "connect (CONN)" which indicates the unhooked state of the handset $100_1$ to the calling source similarly to the "alert" described above, as indicated by (26) in FIG. 3.

When the calling source recognizes the "connect (CONN)", the calling source sends a "connect acknowledge (CONN-ACK)" which indicates this recognition to the mobile station $94_1$ similarly to the "setup" described above, as indicated by (27) in FIG. 3.

In the mobile station $94_1$, when the processor $106_1$ recognizes the "connect acknowledge (CONN-ACK)", the processor $106_1$ notifies this recognition to the TDMA controller $102_1$, and the transmitter/receiver $103_1$. The TDMA controller $102_1$ and the transmitter/receiver $103_1$ secures a talk state by providing an interface between the handset $100_1$ or the external interface $105_1$ and the above described talk channel, as indicated by (28) in FIG. 3.

The "setup", "alert", "connect (CONN)" and "connect acknowledge (CONN-ACK)" are exchanged between end-to-end via the talk channel which is assigned in advance and the talk path corresponding to the talk channel. In addition at the switching station 93, a signal conversion between a signal system which is employed in the radio interval and a signal system which is employed in a subscriber line to which the calling source is connected or employed between stations reaching this subscriber line is carried out by a conversion function (not shown) provided in each node. However, this signal conversion is not directly related to the subject matter of the present invention, and a description thereof will be omitted in this specification.

According to the conventional mobile communication system described above, a single radio channel is assigned for each call. For example, if image information having an amount of information larger than audio information is exchanged as the talk signal after the connection is completed, it is necessary to carry out a radio channel setup control independently for each of the plurality of talk channels adapted to the amount of information of the talk signal. However, in actual practice, the radio channel setup control procedure became complicated and it was impossible to realize such a radio channel setup control procedure.

On the other hand, even if a plurality of talk channels were assigned to each call, the switching of the channels in service would be started asynchronously with respect to the channels in service due to inconsistencies in the characteristics of the transmitter/receiver of the mobile and base stations, the characteristic of the radio transmission path and the like. For this reason, it was extremely difficult if not impossible to actually carry out the switching of the talk channels in service positively and in parallel.

Furthermore, even if it were possible to technically realize the complicated radio channel setup control for realizing the switching of the channel in service by a processing procedure which can flexibly adapt to the phenomenons that may occur during the actual operation, the amount of information to be processed at each of the switching station 93, the radio control station 92, the radio base stations $91_1$ through $91_N$ and the mobile station $94_1$ would become extremely large. Moreover, the number of control information and the amount of information to be exchanged between these stations would increase considerably. As a result, it was impossible from the practical point of view to realize the radio channel setup control because the cost-performance ratio and the transmission efficiency of the radio transmission path greatly deteriorated.

SUMMARY OF THE INVENTION

Accordingly, it is a general object of the present invention to provide a novel and useful mobile station and a radio communication system employing multi-channel access, in which the problems described above are eliminated.

Another and more specific object of the present invention is to provide a mobile station and a radio communication system employing multi-channel access, which can positively assign radio channels adapted to transmitting information having a large amount of information, without the need to greatly modify the hardware construction and the software construction.

Still another object of the present invention is to provide a radio communication system comprising a parent station forming a radio zone, and one or a plurality of child stations located within the radio zone, wherein the parent station comprises assign means for discriminates a type of call based on a call processing procedure with respect to each call generated in the child stations, and out of radio channels forming the radio zone, making a general assignment of a number of free radio channels adapted to the discriminated type of call, based on a radio channel setup control procedure, and talk path setup means for setting up talk paths connecting the parent station with another party in parallel via the individual radio channels assigned by the assign means based on the call processing procedure, with respect to the individual calls, and each of the child stations comprises completed call identifying means for exchanging a line signal with the other party via one representative channel out of the radio channels assigned by the assign means and the talk path which is set up by the talk path setup means in correspondence with the representative channel, and identifying a completed call of a child station to which the completed call identifying means belongs based on a line signal exchange procedure, and talk control means for sending or receiving a talk signal of the completed call which is identified by the completed call identifying means via all of the radio channels assigned by the assign means. According to the radio communication system of the present invention, regardless of whether one or a plurality of radio channels are assigned by the assign means, the call processing is carried out as a single call without having to greatly modify the radio channel setup control procedure. For this reason, it is possible to positively provide a communication service which flexible adapts to the amount of information of the talk signal which differs for each call.

A further object of the present invention is to provide a mobile station adapted to a radio communication system comprising a parent station forming a radio zone and one or a plurality of mobile stations located within the radio zone, wherein the parent station comprises assign means for discriminates a type of call based on a call processing procedure with respect to each call generated in the mobile stations, and out of radio channels forming the radio zone, making a general assignment of a number of free radio channels adapted to the discriminated type of call, based on a radio channel setup control procedure, and talk path setup means for setting up talk paths connecting the parent station with another party in parallel via the individual radio channels assigned by the assign means based on the call processing procedure, with respect to the individual calls, and the mobile station comprises completed call identifying means for exchanging a line signal with the other party via one representative channel out of the radio channels assigned by the assign means and the talk path which is set up by the talk path setup means in correspondence with the representative channel, and identifying a completed call of a mobile station to which the completed call identifying means belongs based on a line signal exchange procedure, and talk control means for sending or receiving a talk signal of the completed call which is identified by the completed call identifying means via all of the radio channels assigned by the assign means. According to the mobile station of the present invention, regardless of whether one or a plurality of radio channels are assigned by the assign means, the call processing is carried out as a single call without having to greatly modify the radio channel setup control procedure. For this reason, it is possible to positively provide a communication service which flexible adapts to the amount of information of the talk signal which differs for each call.

Other objects and further features of the present invention will be apparent from the following detailed description when read in conjunction with the accompanying drawings.

BRIEF DESCRIPTION OF THE DRAWINGS

FIG. 2 is a diagram showing the frame structure;

DESCRIPTION OF THE PREFERRED EMBODIMENTS

First, a description will be given of the operating principle of the present invention, by referring to FIG. 4.

Figure 4:
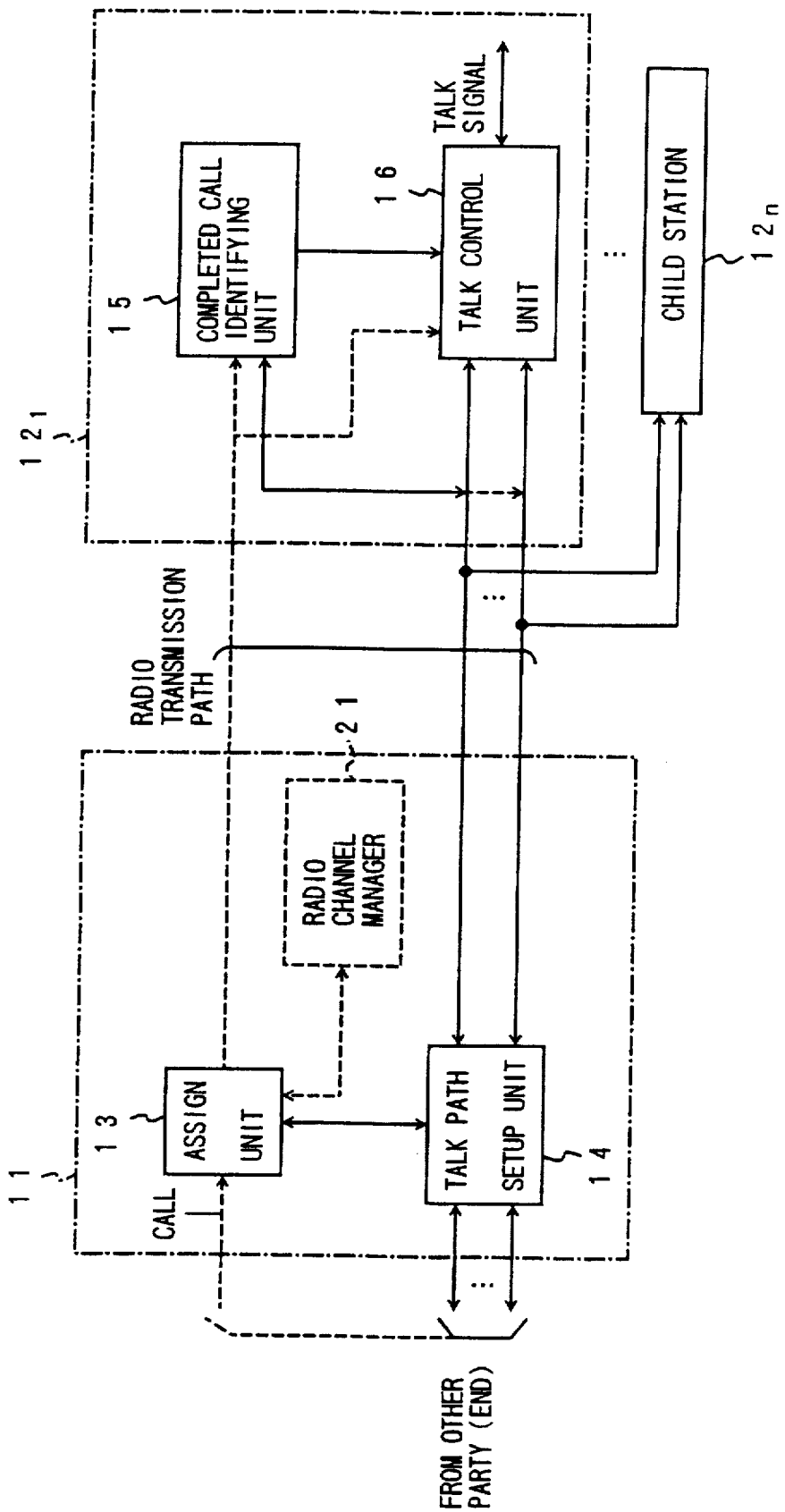
FIG. 4 is a system block diagram for explaining the operating principle of the present invention.

A radio communication system according to the present invention includes a parent station 11 which forms a radio zone and child stations $12_1$ through $12_n$ located within this radio zone, as shown in FIG. 4.

The parent station 11 includes an assign unit 13 and a talk path setup unit 14 which are coupled as shown in FIG. 4. The assign unit 13 discriminates the type of call based on a call processing procedure with respect to each call generated in the child stations $12_1$ through $12_n$. In addition, out of radio channels forming the radio zone, the assign unit 13 makes a general assignment of a number of free radio channels adapted to the discriminated type of call, based on a radio channel setup control procedure. The talk path setup unit 14 sets up talk paths connecting the parent station 11 with the other party in parallel via the individual radio channels assigned by the assign unit 13 based on the call processing procedure, with respect to the individual calls.

Each of the child stations $12_1$ through $12_n$ includes a completed call identifying unit 15 and a talk control unit 16 which are coupled as shown in FIG. 4. The completed call identifying unit 15 exchanges a line signal with the other party via one representative channel out of the radio channels assigned by the assign unit 13 and the talk path which is set up by the talk path setup unit 14 in correspondence with the representative channel, and identifies a completed call of the child station to which the completed call identifying unit 15 belongs based on a line signal exchange procedure. The talk control unit 16 sends or receives a talk signal of the completed call which is identified by the completed call identifying unit 15 via all of the radio channels assigned by the assign unit 13.

Hence, regardless of whether one or a plurality of radio channels are assigned by the assign unit 13, the call processing is carried out as a single call without having to greatly modify the radio channel setup control procedure. For this reason, it is possible to positively provide a communication service which flexible adapts to the amount of information of the talk signal which differs for each call.

In the radio communication system shown in FIG. 4, the assign unit 13 may be provided with a means for identifying a change in the amount of information of the talk signal with respect to the completed call based on the call processing procedure, and for successively making a general assignment of a number of radio channels proportional to an updated value of the amount of information depending on the identified change.

In this case, the talk path setup unit 14 sets up the talk paths connecting with the other party in parallel with respect to all of the radio channels which are assigned in this manner. Hence, with respect to each completed call generated in the child stations $12_1$ through $12_n$, the talk signal is positively exchanged via the transmission paths having a communication capacity flexible adapted to the change in the amount of information of the talk signal.

In addition, in the radio communication system shown in FIG. 4, the parent station 11 may be provided with a radio channel manager 21 which stores each radio channel assigned by the assign unit 13 and the call to which each radio channel is assigned, in correspondence with each other. In this case, the assign unit 13 is provided with a means for starting switching of the channels in service. More particularly, a number of free radio channels depending on the type of call are searched by referring to the radio channel manager 21, with respect to a set of radio channels the individual child stations $12_1$ through $12_n$ can send or receive the talk signal via the talk control unit 16, and this means starts the switching of the channels in service with respect to the free radio channels belonging to another set, with respect to each of the calls stored in the radio channel manager 21 and corresponding to the shortage of the free radio channels.

In this case, when the switching of the channels in service is completed, the assign unit 13 supplements the radio channels which are released depending on the switching of the talk channels based on the radio channel setup control procedure, as the above described shortage of the free radio channels, and makes the assignment described above.

In other words, the radio channels which are assigned to the newly generated call or completed call in the child station are dynamically reassigned within a range of the total number of free radio channels. As a result, the radio transmission path for the talk signal having a large amount of information is formed with a high accuracy.

On the other hand, in the radio communication system shown in FIG. 4, the parent station 11 may be provided with a radio channel manager 21 which stores each radio channel assigned by the assign unit 13 and the call to which each radio channel is assigned, in correspondence with each other. In this case, the assign unit 13 is provided with a means for setting a limit of the assignment with priority. More particularly, out of a set of radio channels the individual child stations $12_1$ through $12_n$ can send or receive the talk signal via the talk control unit 16, this means sets the limit of the assignment with priority to the number of free radio channels greater than or equal to a maximum number of radio channels which are to be assigned with respect to a single call.

In this case, in a state where the number of completed calls is small to a certain extent such that it is possible to assign the radio channels within the set limit of the assignment, it is possible to secure the radio channels which are to be assigned to the subsequent completed calls with the talk signal having a large amount of information.

Furthermore, it is possible to provide a further means in the assign unit 13 so that when the number of free radio channels is smaller than the maximum number with respect to all of the sets of radio channels the child station can send or receive the talk signal via the talk control unit 16, this further means sets the limit of the assignment with priority to the free radio channels of the set having a small number of free radio channels.

With respect to the free radio channels, the free radio channels belonging to the set having a large number of free radio channels have a small possibility of being assigned to a call. For this reason, it is possible in this case to secure the radio channels which are to be assigned to the subsequent completed calls with the talk signal having a large amount of information.

Next, a description will be given of a first embodiment of the radio communication system according to the present invention, by referring to FIGS. 5 through 12. This embodiment of the radio communication system uses a first embodiment of a mobile station according to the present invention.

Figure 5:
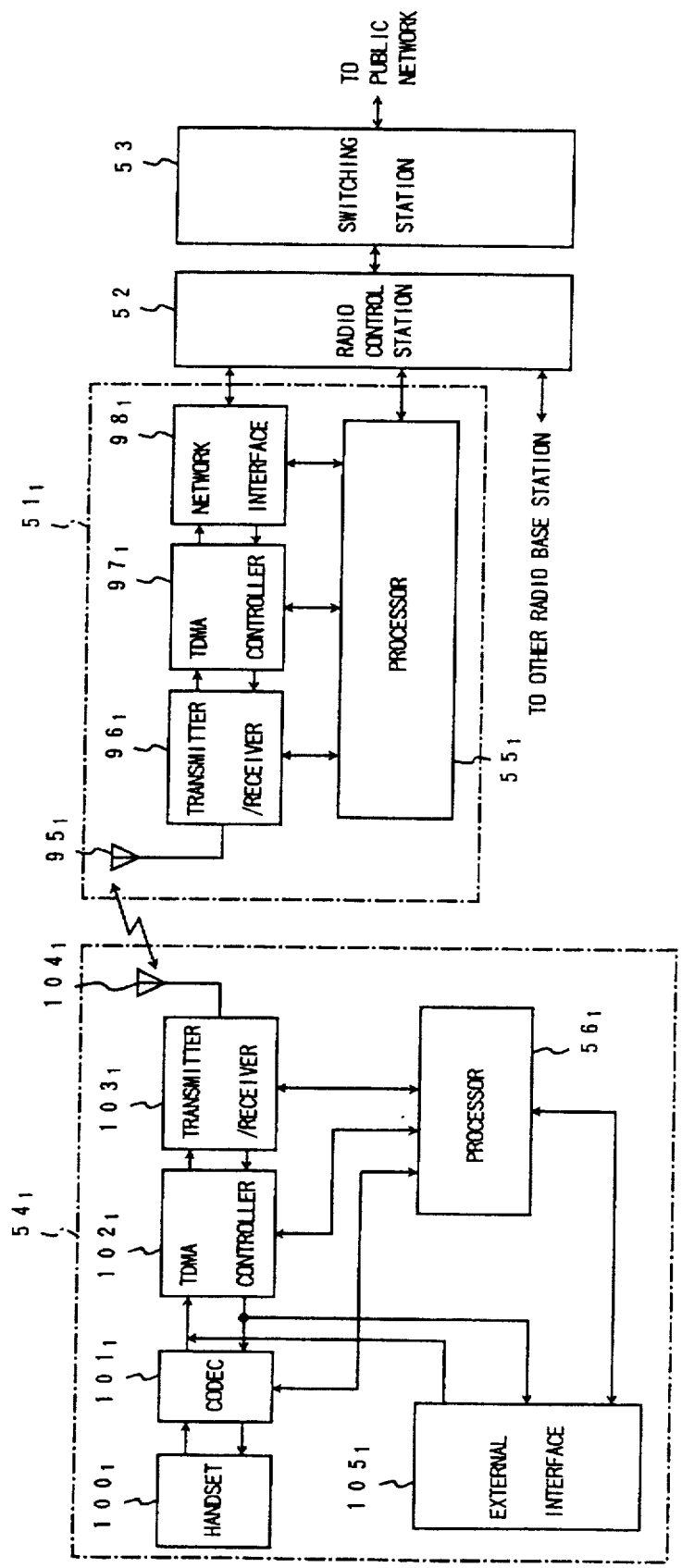
FIG. 5 is a system block diagram showing a first embodiment of a radio communication system according to the present invention.

FIG. 5 is a system block diagram showing the first embodiment of the radio communication system. In FIG. 5, those parts which are the same as those corresponding parts in FIG. 1 are designated by the same reference numerals, and a description thereof will be omitted.

Figure 1:
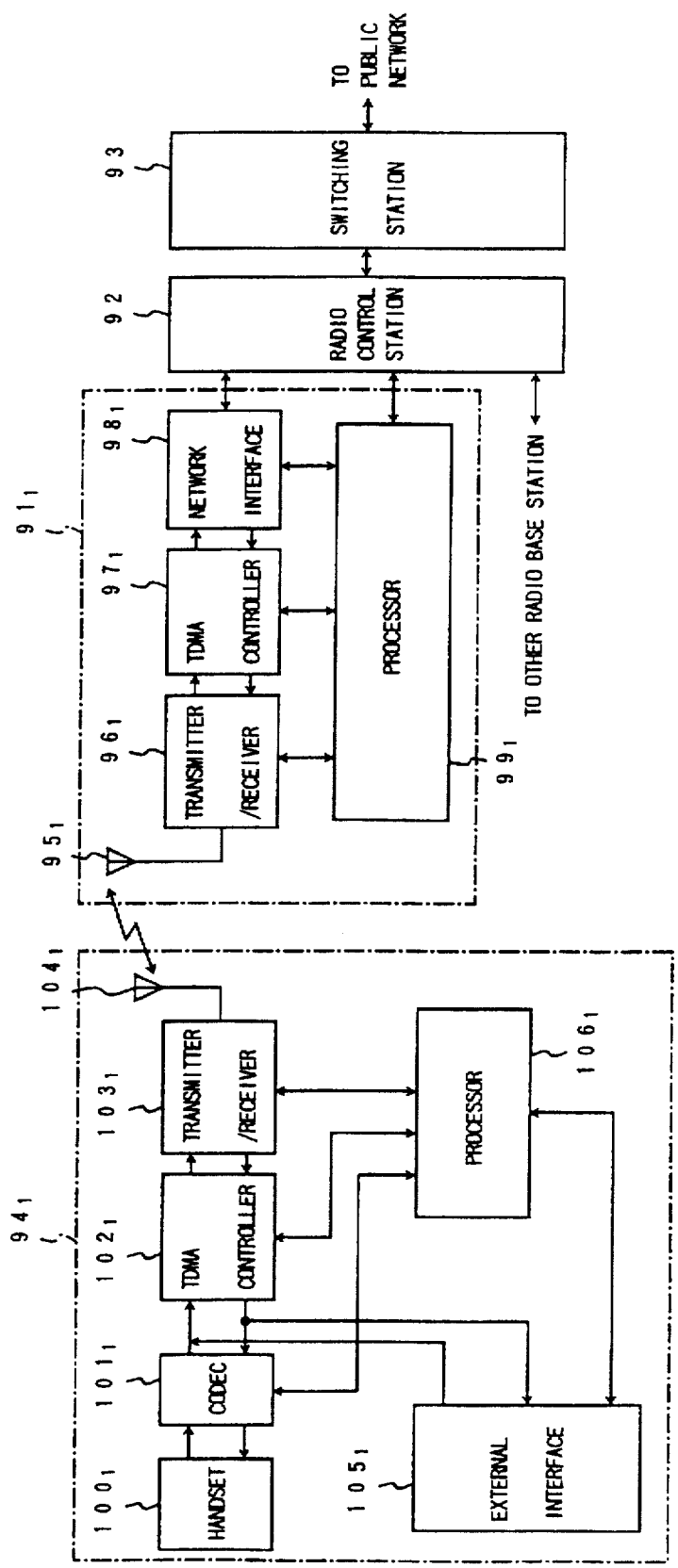
FIG. 1 is a system block diagram showing the construction of an example of a conventional mobile communication system.

The construction of this first embodiment of the radio communication system differs from the construction of the conventional radio communication system shown in FIG. 1, in that radio base stations $51_1$ through $51_N$ are provided in place of the radio base stations $91_1$ through $91_N$, a radio control station 52 is provided in place of the radio control station 92, a switching station 53 is provided in place of the switching station 93, and mobile stations $54_1$ through $54_n$ are provided in place of the mobile stations $94_1$ through $94_n$.

In addition, the construction of the radio base station $51_1$ is different from that of the radio base station $91_1$ in that a processor $55_1$ is provided in place of the processor $99_1$. The construction of the mobile station $54_1$ is different from that of the mobile station $94_1$ in that a processor $56_1$ is provided in place of the processor $106_1$.

The construction of each of the radio base stations $51_2$ through $51_N$ is the same as that of the radio base station $51_1$, and the construction of each of the mobile stations $54_2$ through $54_n$ is the same as that of the mobile station $54_1$, and illustration and description thereof will therefore be omitted.

The radio base stations $51_1$ through $51_N$, the radio control station 52 and the switching station 53 shown in FIG. 5 correspond to the parent station 11 shown in FIG. 4 which includes the assign unit 13, the talk path setup unit 14 and the radio channel manager 21. The mobile stations $54_1$ through $54_n$ shown in FIG. 5 correspond to the child stations $12_1$ through $12_n$ shown in FIG. 4 respectively including the completed call identifying unit 15 and the talk control unit 16.

Figure 3:
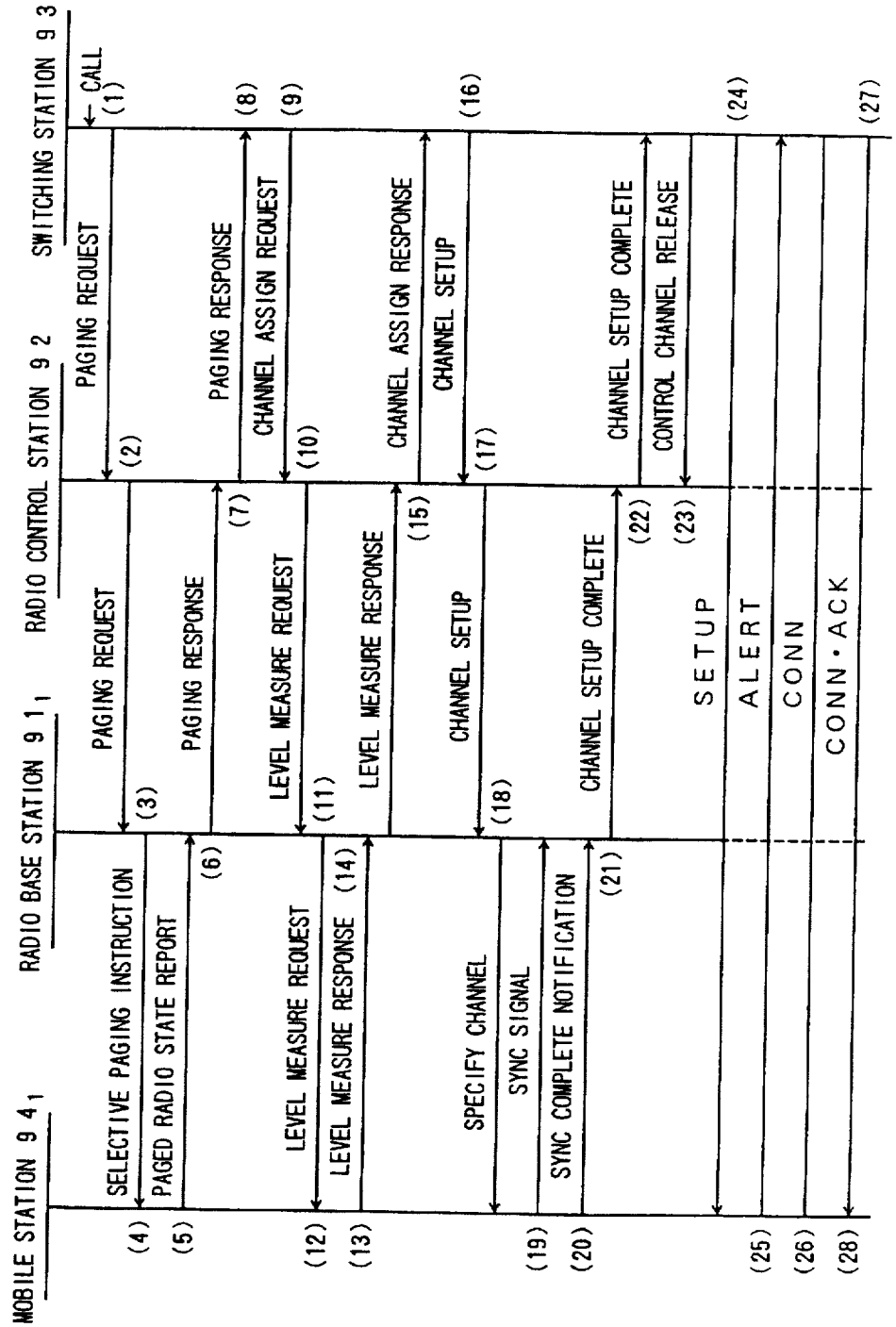
FIG. 3 is a time chart for explaining the operation of the conventional mobile communication system.
Figure 6:
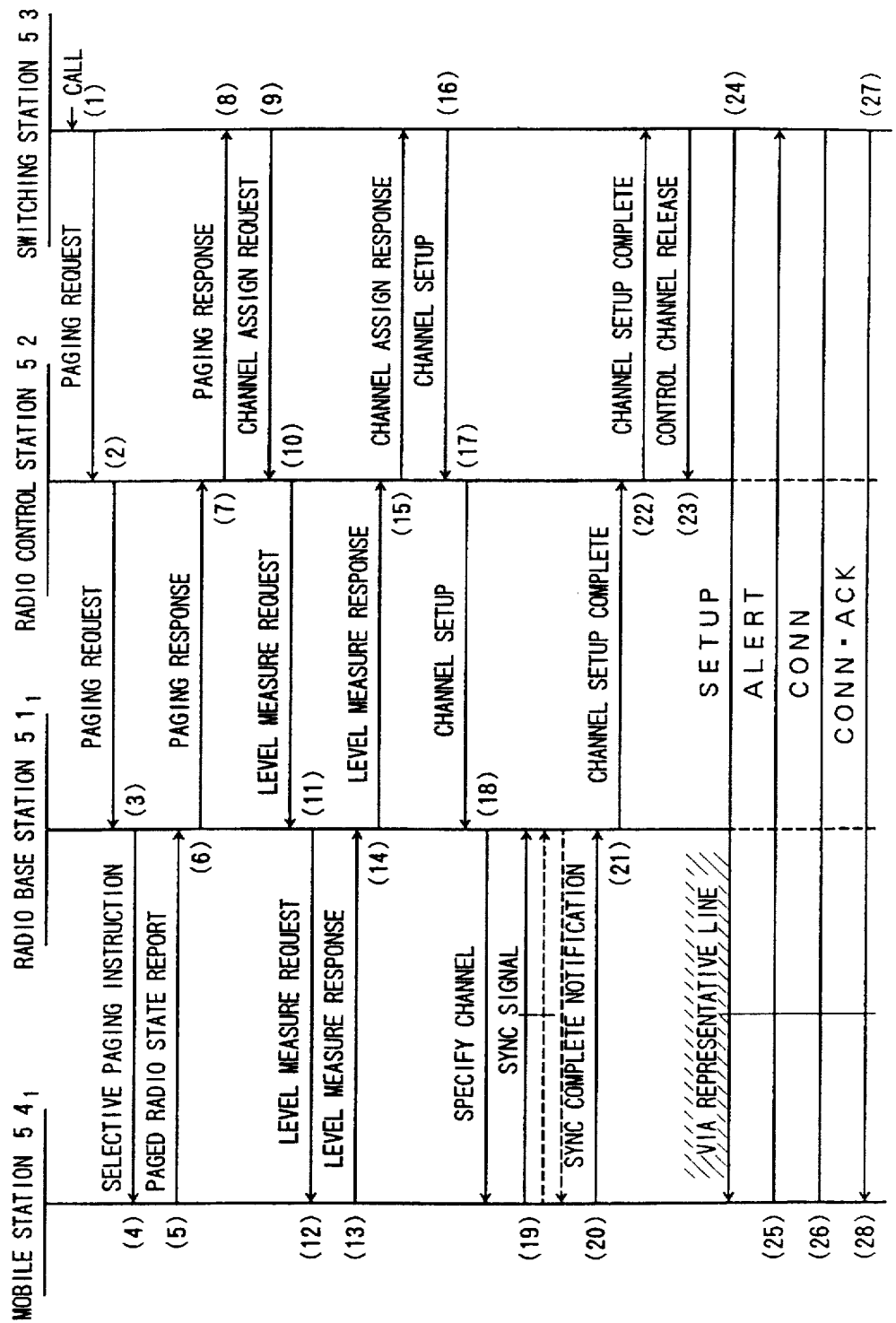
FIG. 6 is a time chart for explaining the operation of the first embodiment.

FIG. 6 is a time chart for explaining the operation of this embodiment of the radio communication system. In FIG. 6, those parts which are the same as those corresponding parts in FIG. 3 are designated by the same reference numerals, and a description thereof will be omitted.

Figure 7:
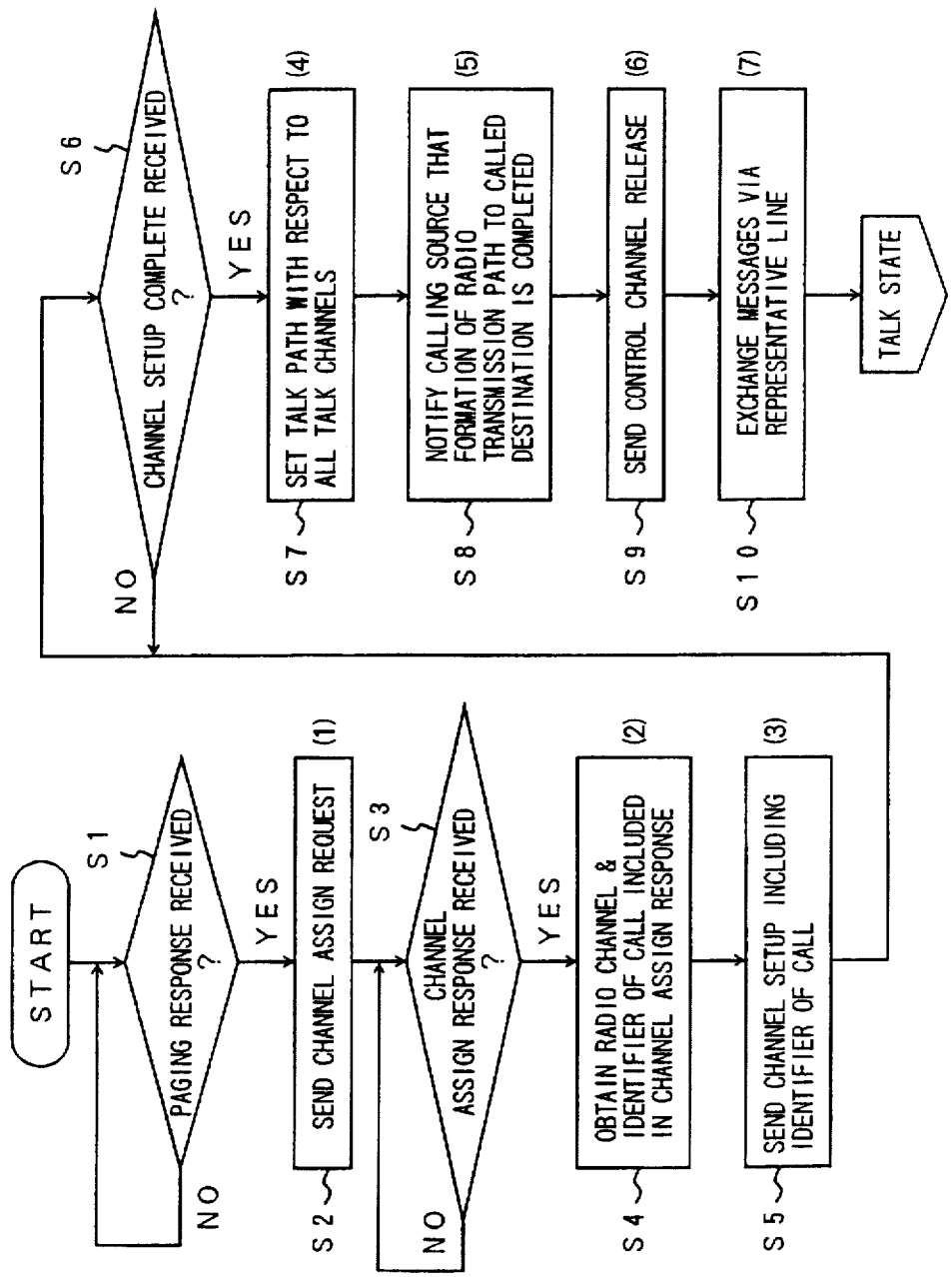
FIG. 7 is a flow chart for explaining the operation of a switching station of the first embodiment.
Figure 8:
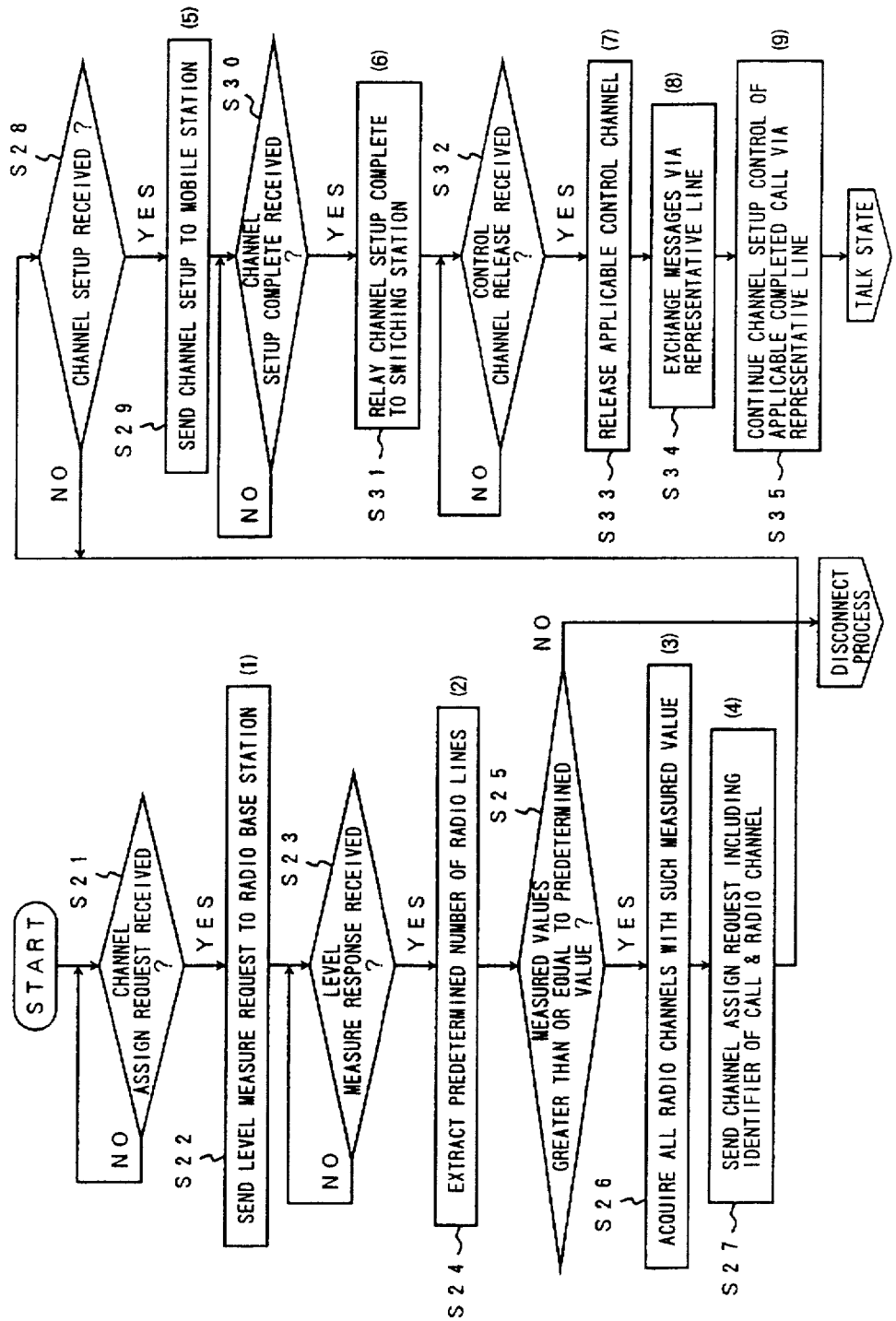
FIG. 8 is a flow chart for explaining the operation of a radio control station of the first embodiment.
Figure 9:
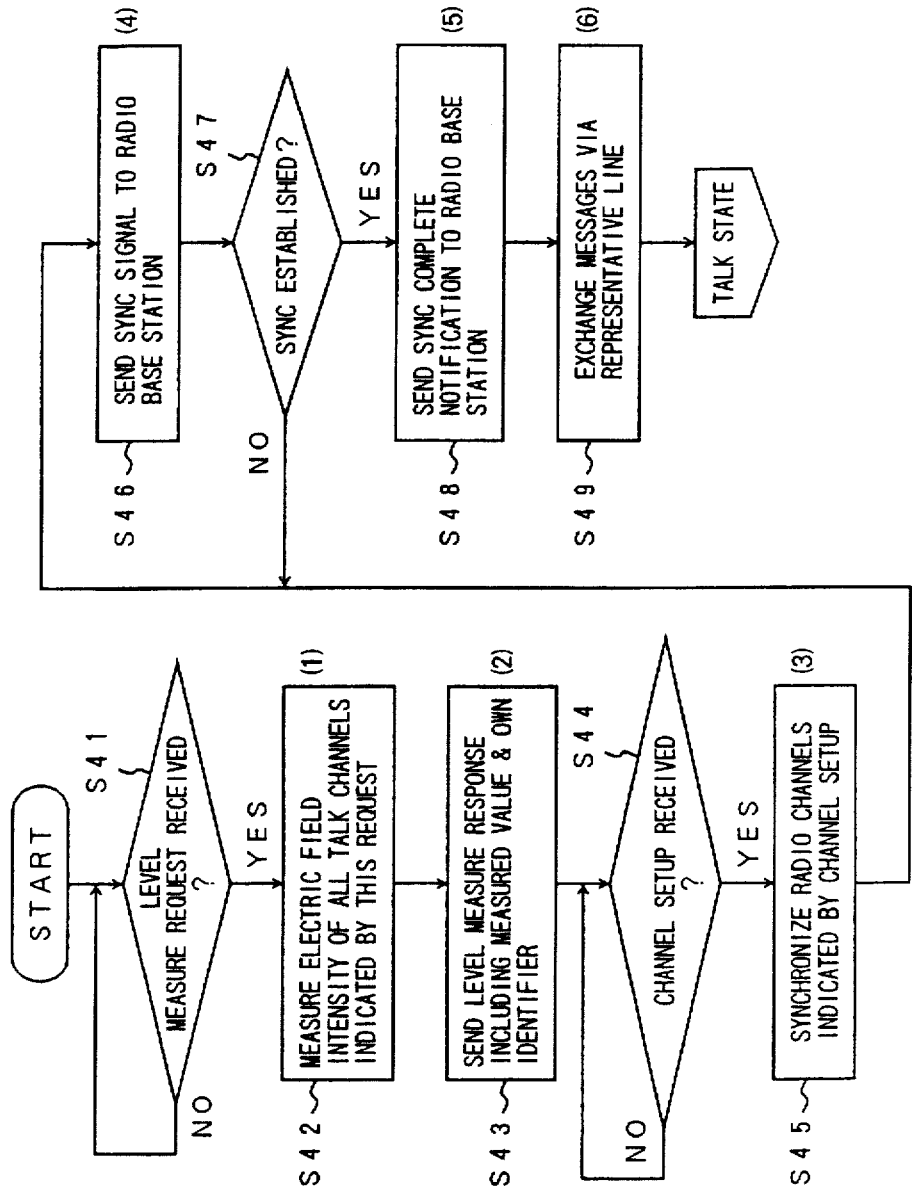
FIG. 9 is a flow chart for explaining the operation of a mobile station of the first embodiment, that is, an embodiment of the mobile station according to the present invention.

FIG. 7 is a flow chart for explaining the operation of the switching station 53 of this embodiment. FIG. 8 is a flow chart for explaining the operation of the radio control station 52 of this embodiment. FIG. 9 is a flow chart for explaining the operation of the mobile station $54_1$ of this embodiment.

Figure 10:
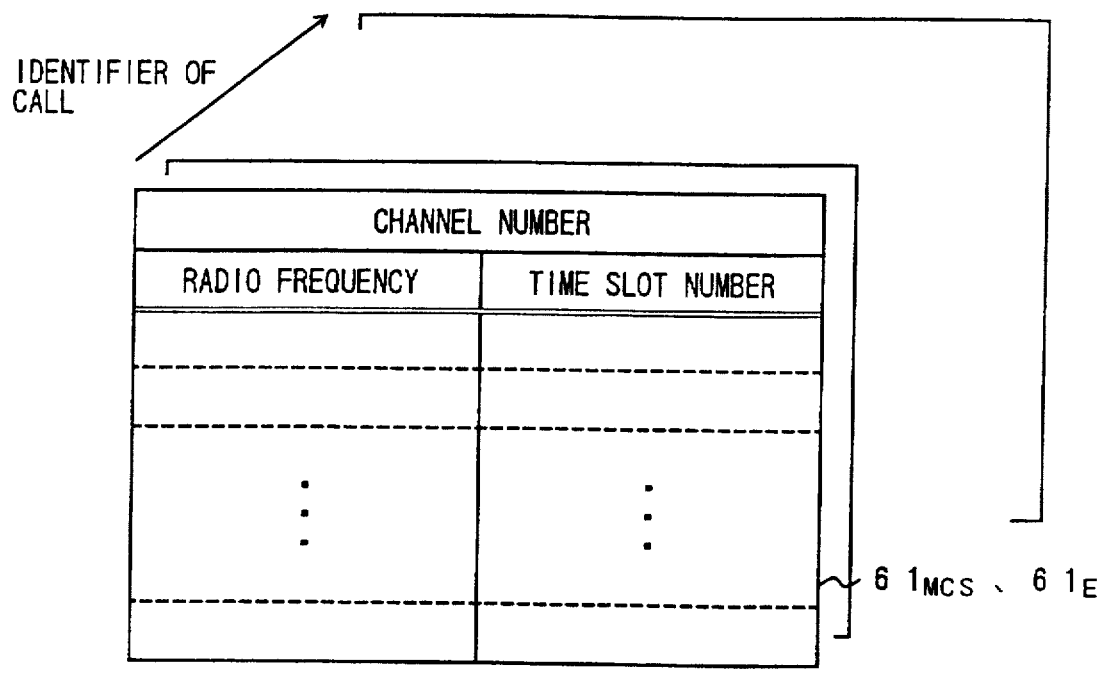
FIG. 10 is a diagram showing the structure of a call management table.

The switching station 53 and the radio control station 52 respectively have call management tables $61_E$ and $61_{MCS}$ shown in FIG. 10. With respect to each of the individual radio channels which are the subject of the radio channel setup control that is carried out by the radio control station 52, the call management tables $61_E$ and $61_{MCS}$ store, for each call, a plurality of channel numbers including the radio frequency and a time slot number which forms a corresponding radio channel out of a plurality of time slots that are obtained by a time-division of the radio frequency. For the sake of convenience, if the radio frequency indicating the channel number and the time slot number are both "0", it is indicated that the radio channel in this state is an invalid radio channel which is not subjected to the radio channel setup control.

Figure 11:
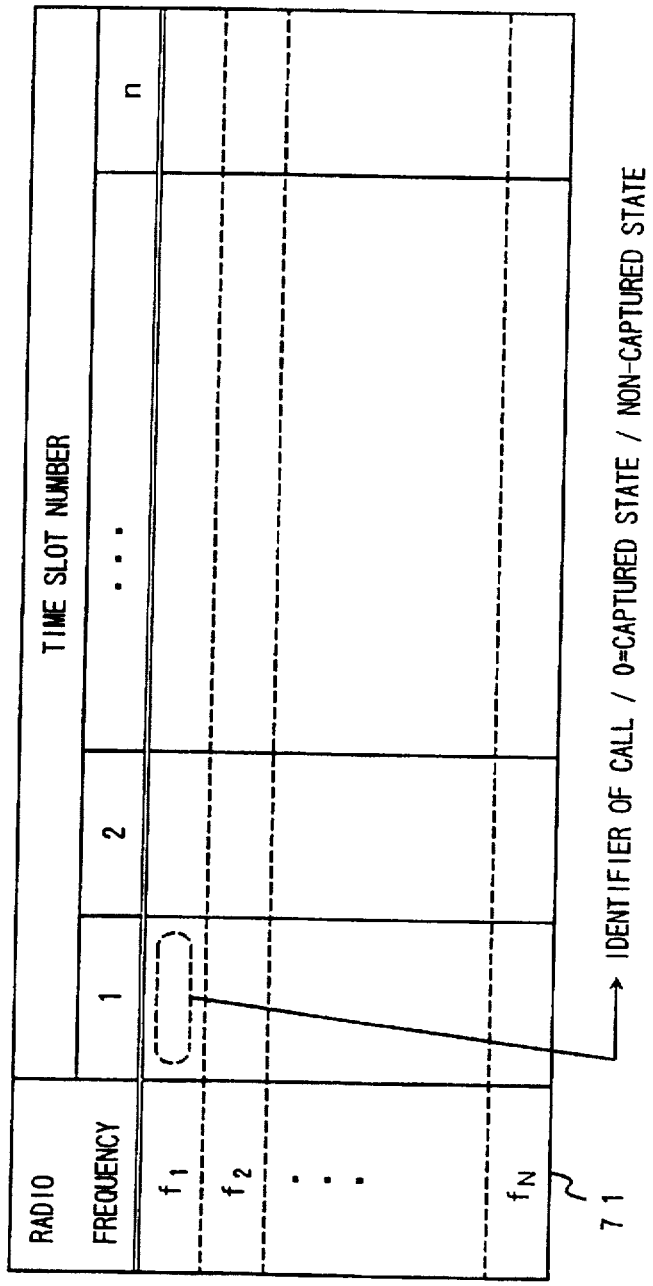
FIG. 11 is a diagram showing the structure of a radio channel state table.

Further, the radio control station 52 has a radio channel state table 71 shown in FIG. 11. With respect to each radio channel made up of the combination of the above described radio frequency and time slot, the radio channel state table 71 stores a value "0" when the radio channel is free and stores an identifier of a call when the radio channel is assigned to this call, as shown in FIG. 11.

Figure 12:
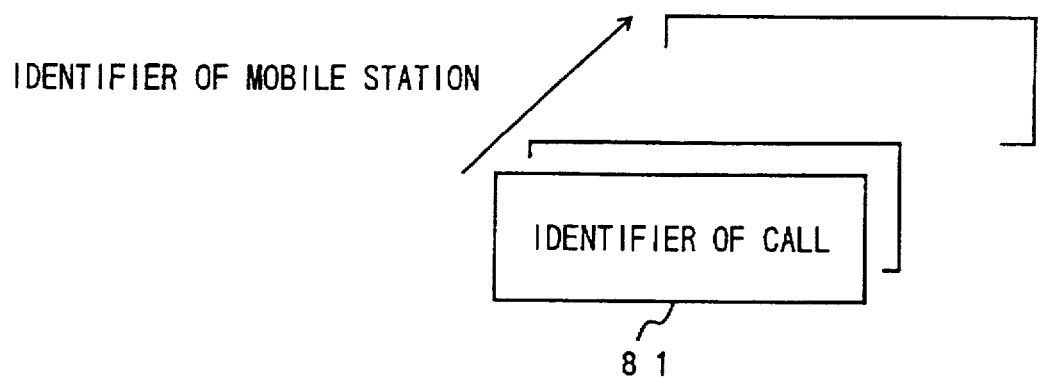
FIG. 12 is a diagram showing the construction of a call identifier table.

As shown in FIG. 12, the radio control station 52 has a call identifier table 81. This call identifier table 81 stores an identifier of a call in correspondence with the identifier of each mobile station in which the call is generated.

For the sake of convenience, it is assumed that an initial value "0" is set in all regions of the group management tables $61_E$ and $61_{MCS}$, the radio channel state table 71 and the group number table 81, prior to carrying out the process described hereunder.

Similarly to the conventional radio communication system, when a call having the mobile station $54_1$ as the called destination is generated, the switching station 53 sends a "paging request" which requests paging of the mobile station $54_1$ to the radio control station 52 as indicated by (1) in FIG. 6. In addition, the type of this call is obtained based on the call processing procedure. The type of the call includes the amount of information to be exchanged as the talk signal.

When the switching station 53 receives and recognizes a "paging response" from the radio control station 52 depending on the "paging request", the switching station 53 identifies the call corresponding to the identifier included in the "paging response". In addition, the switching station 53 calculates a predetermined number of radio channels adapted to the amount of information obtained as the type of call, and generates a "channel assign request" which includes the identifier and the predetermined number. The switching station 53 sends this "channel assign request" to the radio control station 52 as indicated by (8) and (9) in FIG. 6.

In other words, in FIG. 7, a step S1 decides whether or not the "paging response" is received, and a step S2 sends the "channel assign request" when the decision result in the step S1 becomes YES.

When the radio control station 52 recognizes the "channel assign request", the radio control station 52 generates a "level measure request" which requests measurement of the received electric field intensity of the radio channel (hereinafter referred to as "talk channel") of the radio base station $51_1$ in the periphery of the radio zone in which the "paging response" is received. The radio control station 52 sends this "level measure request" to the radio base station $51_1$ as indicated by (10) in FIG. 6.

In other words, in FIG. 8, a step S21 decides whether or not the "channel assign request" is received, and a step S22 sends the "level measure request" to the radio base station $51_1$ when the decision result in the step S21 becomes YES.

At the mobile station $54_1$, when the processor $56_1$ receives the "level measure request", the processor $56_1$ measures the electric field intensity via the transmitter/receiver $103_1$ under the synchronous control of the TDMA controller $102_1$ with respect to the talk channel which is indicated by the "level measure request". This talk channel includes a set of one or a plurality of time slots shown in FIG. 2. In addition, the processor $56_1$ generates a "level measure response" which includes the measured value of the electric field intensity and the identifier of the mobile station $54_1$ to which the processor $56_1$ belongs as indicated by (12) in FIG. 6. Furthermore, the processor $56_1$ sends the "level measure response" to the radio base station $51_1$ similarly to the "paged radio state report" described above as indicated by (13) in FIG. 6.

In other words, in FIG. 9, a step S41 decides whether or not the "level measure request" is received, and a step S42 measures the electric field intensity of all talk channels indicated by this "level measure request" when the decision result in the step S41 becomes YES. Further, a step S43 sends the "level measure response" which includes the measured value of the electric field intensity and the identifier of the mobile station $54_1$ to which the processor $56_1$ belongs.

The radio control station 52 makes a reference to the radio channel state table 71 and the measured value included in the "level measure response" which is received via the radio base station $51_1$, and compares the radio channels which are free at this point in time. The radio control station 52 discriminates whether or not it is possible to secure a number of talk channels equal to the predetermined number described above such that the measured value is sufficiently large so as to enable the talk service.

In other words, in FIG. 8, a step S23 decides whether or not the "level measure response" is received, and a step S24 extracts a predetermined number of radio lines when the decision result in the step S23 becomes YES.

In addition, when the radio control station 52 discriminates that it is possible to secure the number of talk channels equal to the predetermined number, the radio control station 52 makes a reference to the identifier of the call in the radio channel state table 71 with respect to the applicable talk channel, and stores this identifier in a region of the call identifier table 81 corresponding to the identifier of the mobile station included in the "level measure response", so as to establish the acquisition of the talk channel that is carried out prior thereto. In other words, in FIG. 8, a step S25 decides whether or not all of the measured values are greater than or equal to a predetermined value, and a disconnect process is carried out if the decision result in the step S25 is NO. On the other hand, if the decision result in the step S25 is YES, a step S26 acquires all of the radio channels with the measured value greater than or equal to the predetermined value. Further, with respect to all of the talk channels, the radio control station 52 obtains the combinations of the time slot number and the radio frequency indicated by the radio channel state table 71, and stores the combinations in corresponding regions of the call management table $61_{MCS}$. The radio control station 52 also generates a "channel assign response" including the identifier of the call and the channel number column made up of these combinations, and sends the "channel assign response" to the switching station 53 as indicated by (15) in FIG. 6. In other words, in FIG. 8, a step S27 sends the "channel assign response" which includes the identifier of the call and the radio channel.

When the switching station 53 recognizes the "channel assign response", the switching station 53 obtains the channel number column and the identifier of the call included in the "channel assign response". In addition, the switching station 53 stores the channel number column in the region of the call management table $61_E$ corresponding to the identifier of the call, and generates a "channel setup" which includes the identifier of the applicable call. The switching station 53 sends this "channel setup" to the radio control station 52 as indicated by (16) in FIG. 6.

In other words, in FIG. 7, a step S3 decides whether or not the "channel assign response" is received, and a step S4 obtains the radio channel and the identifier of the call included in the "channel assign response" when the decision result in the step S3 becomes YES. Further, a step S5 sends the "channel setup" which includes the identifier of the call.

The radio control station 52 generates a "channel setup" which includes the channel number of all talk channels stored in the call management table $61 MCs$ in correspondence with the identifier of the call included in the "channel setup" received from the switching station 53, and sends this "channel setup" to the mobile station $54_1$ via the radio base station $51_1$ as indicated by (17) and (18) in FIG. 6.

In other words, in FIG. 8, a step S28 decides whether or not the "channel setup" is received from the switching station 53, and a step S29 sends the "channel setup" to the mobile station $54_1$ when the decision result in the step S28 becomes YES.

At the mobile station $54_1$ the processor $56_1$ notifies each of the talk channels indicated by the "channel setup" to the TDMA controller $102_1$, and the TDMA controller $102_1$ successively carries out the synchronization with respect to these talk channels. In other words, in FIG. 9, a step S44 decides whether or not the "channel setup" is received via the radio base station $51_1$, and a step S45 synchronizes the radio channels indicated by the "channel setup". In addition, similarly to the "level measure response", the processor $56_1$ sends a synchronizing signal which is used as a reference for establishing synchronization to the radio base station $51_1$ under the synchronization of the TDMA controller $102_1$ as indicated by (19) in FIG. 6. That is, in FIG. 9, a step S46 sends the synchronizing signal to the radio base station $51_1$.

In addition, when the synchronization described above is established, the TDMA controller $102_1$ notifies the establishment of the synchronization to the processor $56_1$. When the processor $56_1$ recognizes this notification, the processor $56_1$ sends a "synchronization complete notification" which indicates the establishment of the synchronization together with the identifier of the mobile station $54_1$ to which the processor $56_1$ belongs to the radio base station $51_1$ as indicated by (20) in FIG. 6.

In other words, in FIG. 9, a step S47 decides whether or not the synchronization is established, and a step S48 sends the "synchronization complete notification" to the radio base station $51_1$ when the decision result in the step S47 becomes YES.

At the radio base station $51_1$, when the processor $99_1$ receives and recognizes the "synchronization complete notification" and also recognizes that the synchronization of the above described talk channels is established under the TDMA controller $97_1$ the processor $99_1$ notifies a "channel setup complete" which indicates this and includes the identifier of the applicable call to the radio control station 52 as indicated by (21) in FIG. 6.

The radio control station 52 relays the "channel setup complete" to the switching station 53 as indicated by (22) in FIG. 6. In other words, in FIG. 8, a step S30 decides whether or not the "channel setup complete" is received, and a step S31 relays the "channel setup complete" to the switching station 53 when the decision result in the step S30 becomes YES.

The switching station 53 makes a reference to the call management table $61_E$ based on the identifier of the call included in the "channel setup complete", and obtains all of the talk channels assigned to the applicable call. Based on a predetermined trunking diagram which indicates the corresponding relationship between the radio channels and the talk path switches, the switching station 53 forms a corresponding talk path in the talk channels between the switching station 53 and the calling source. In other words, in FIG. 7, a step S6 decides whether or not the "channel setup complete" is received, and a step S7 sets the talk path with respect to all of the talk channels when the decision result in the step S6 becomes YES. Furthermore, the switching station 53 notifies the calling source that the formation of the radio transmission path to the called destination is completed in a step S8 shown in FIG. 7, and generates and sends a "control channel release" to the radio control station 52 in a step S9 shown in FIG. 7.

The radio control station 52 releases the control channel which is used as the radio transmission path for the control information related to the applicable call when the "control channel release" is recognized as indicated by (23) in FIG. 6. In other words, in FIG. 8, a step S32 decides whether or not the "control channel release" is received, and a step S33 releases the applicable control channel when the decision result in the step S32 becomes YES.

The switching station 53 generates a "setup" which requests paging of the called destination depending on the notification received from the calling source. The switching station 53 sends this "setup" to the mobile station $54_1$ via a transmission path (hereinafter referred to as a "representative line") which corresponds to one of the radio channels formed in the above described talk path via the switching station 53, the radio control station 52 and the radio base station $51_1$ as indicated by (24) in FIG. 6.

In addition, the mobile station $54_1$ and the calling source exchange "alert", "connect (CONN)", "connect acknowledge (CONN-ACK)" via the representative line, and the communication state enters the talk state as indicated by (25) through (28) in FIG. 6, similarly to the conventional radio communication system. More particularly, in FIG. 7, a step S10 exchanges messages via the representative line, and the communication state enters the talk state. In FIG. 8, a step S34 exchanges the messages via the representative line, a step S35 continues the channel setup control of the applicable completed call via the representative line, and the communication state enters the talk state. Further, in FIG. 9, a step S49 exchanges the messages via the representative line, and the communication state enters the talk state.

Therefore, according to this embodiment, it is possible to efficiently assign as the talk channel a number of radio channels dependent on the amount of information of the talk signal, without the need to greatly modify the processing procedure to be carried out by the switching station, the radio control station, the radio base station and the mobile station when compared to the conventional radio communication system.

Next, a description will be given of a second embodiment of the radio communication system according to the present invention, by referring to FIG. 13. This embodiment of the radio communication system uses a second embodiment of a mobile station according to the present invention.

The basic construction of this second embodiment of the radio communication system is the same as that of the first embodiment shown in FIG. 5, and illustration and description thereof will be omitted.

Figure 13:
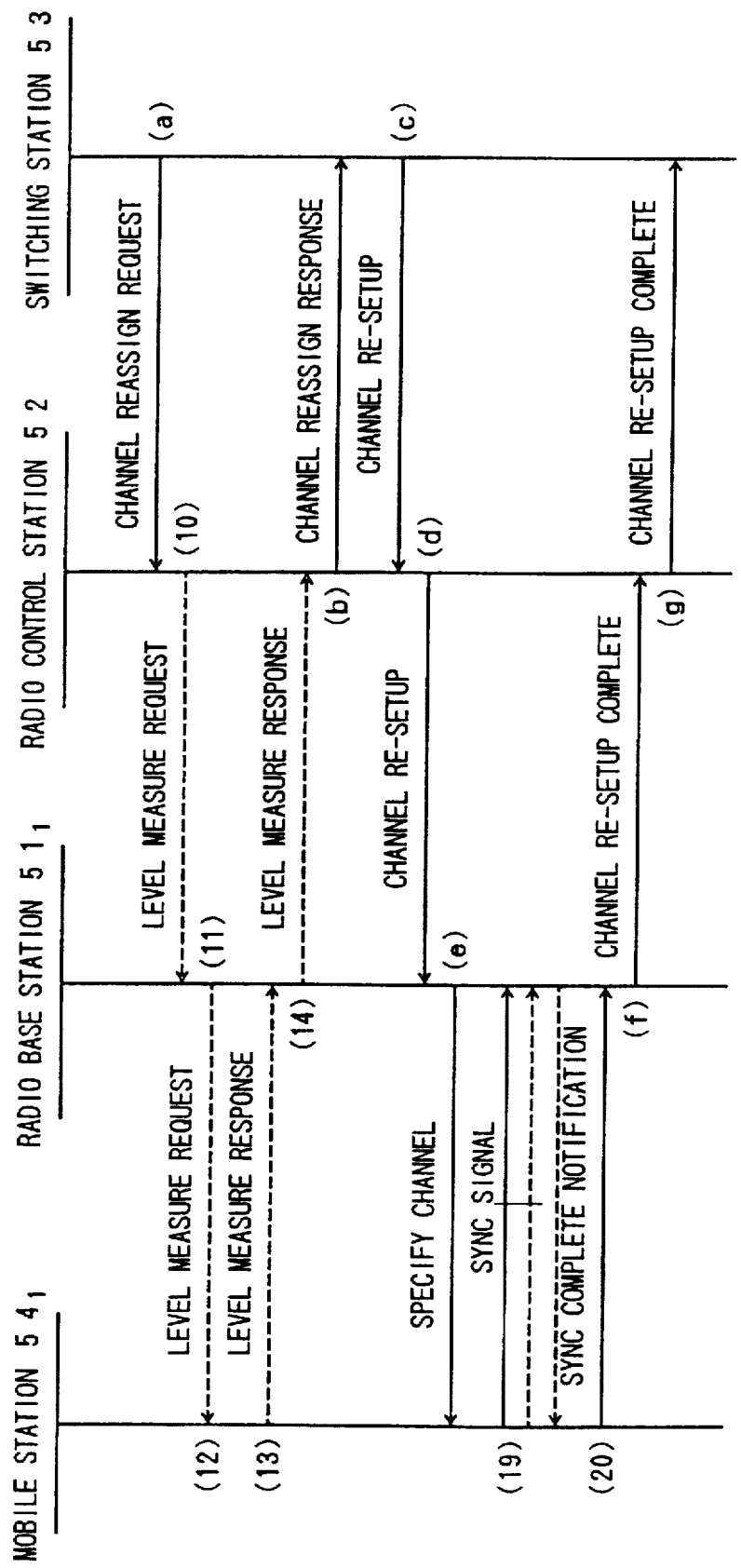
FIG. 13 is a time chart for explaining the operation of a second embodiment of the radio communication system according to the present invention.
Figure 14:
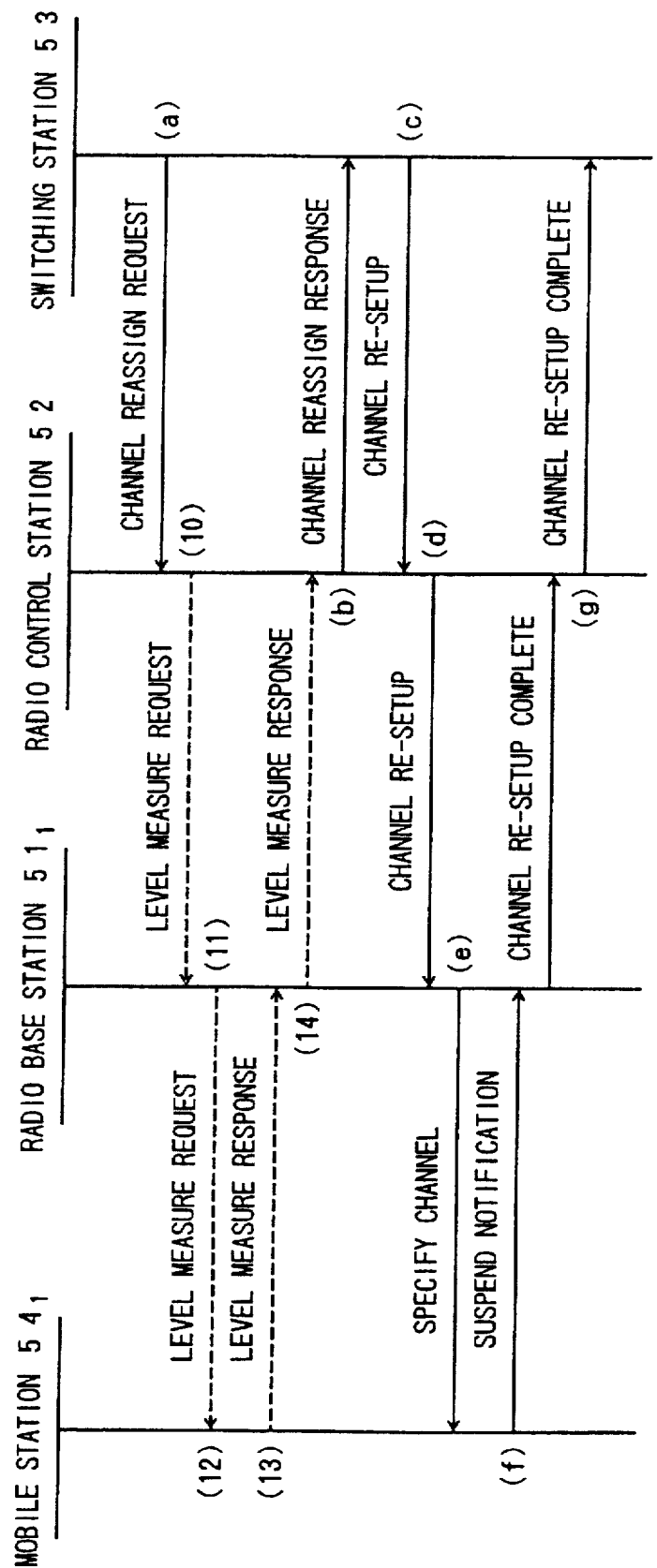
FIG. 14 is a time chart for explaining the operation of a modification of the second embodiment.

FIG. 13, and FIG. 14 which will be described later, are time charts for explaining the operation of this embodiment of the radio communication system. In FIGS. 13 and 14, those parts which are the same as those corresponding parts in FIGS. 3 and 6 are designated by the same reference numerals, and a description thereof will be omitted.

For the sake of convenience, it is assumed that the call is generated as in the case of the first embodiment described above. For example, in a state where the connection completed call of the mobile station $54_1$ is maintained, a message (or a line signal) which indicates that the amount of information to be transmitted or received as a subsequent talk signal by the other party which is to connect with the mobile station $54_1$ increases and also indicates the number of talk channels to be added depending on the increase in the amount of information is notified to the switching station 53. In this case, the switching station 53 sends such a message to the radio control station 52 as a "channel reassign request", similarly to sending the "channel assign request" described above, as indicated by (a) in FIG. 13.

When the radio control station 52 recognizes the "channel reassign request", the radio control station 52 makes a reference to the radio channel state table 71 and obtains the above described number of free radio channels (hereinafter referred to as "additional talk channels") out of the radio channels which are free at this point in time. The radio control station 52 further writes the identifier of the call in a corresponding region of the radio channel state table 71, and acquires these additional talk channels. In addition, with respect to all of the additional talk channels, the radio control station 52 obtains and stores in corresponding regions of the call management table $61_{MCS}$ the combinations of the time slot number and the radio frequency indicated by the radio channel state table 71. The radio control station 52 sends a "channel reassign response" which includes the identifier of the call and the channel number column made up of these combinations to the switching station 53 as indicated by (b) in FIG. 13.

When the switching station 53 recognizes this "channel reassign response", the switching station 53 obtains the identifier of the call and the channel number column included in the "channel reassign response" and additionally stores the channel number column in a region of the call management table $61_E$ corresponding to the identifier of the call. Further, the switching station 53 generates a "channel re-setup" which includes the identifier of the applicable call and sends this "channel re-setup" to the radio control station 52 as indicated by (c) in FIG. 13.

The radio control station 52 generates a "channel re-setup" which includes the channel number of all of the additional talk channels stored in the call management table $61_{MCS}$ in correspondence with the identifier of the call included in the "channel resetup" received from the switching station 53, and sends this "channel re-setup" to the mobile station $54_1$ via the radio base station $51_1$ as indicated by (d) and (e) in FIG. 13.

At the mobile station $54_1$, the processor $56_1$ notifies each talk channel indicated by the "channel re-setup" to the TDMA controller $102_1$, and the TDMA controller $102_1$ successively achieves synchronization with respect to each talk channel. In addition, under this synchronization provided by the TDMA controller $102_1$, the processor $56_1$ sends a synchronizing signal which is used as a reference for establishing the synchronization to the radio base station $51_1$ as indicated by (19) in FIG. 13.

Moreover, when the above described synchronization is established, the TDMA controller $102_1$ notifies this establishment of the synchronization to the processor $56_1$. When the processor $56_1$ recognizes this notification from the TDMA controller $102_1$, the processor $56_1$ sends a "synchronization complete notification" which indicates the establishment of the synchronization together with the identifier of the mobile station $54_1$ to which the processor $56_1$ belongs to the radio base station $51_1$ as indicated by (20) in FIG. 13.

At the radio base station $51_1$, the processor $99_1$ receives and recognizes the "synchronization complete notification". In addition, when the processor $99_1$ recognizes that the synchronization of the talk channels is established under the TDMA controller $97_1$, the processor $99_1$ notifies a "channel re-setup complete" which indicates this and includes the identifier of the applicable call to the radio control station 52 as indicated by (f) in FIG. 13.

The radio control station 52 relays the "channel re-setup complete" to the switching station 53 as indicated by (g) in FIG. 13.

The switching station 53 makes a reference to the call management table $61_E$ based on the identifier of the call included in the "channel resetup complete", so as to obtain all of the additional talk channels which are additionally assigned to the applicable call. Based on a predetermined trunking diagram, the switching station 53 forms a talk path corresponding to these talk channels between the switching station 53 and the calling source. Further, the switching station 53 notifies the calling source that the formation of the radio transmission path to the called destination is completed. The calling source recognizes that it is possible to exchange the talk signal at a new transmission rate depending on this notification from the switching station 53, and the calling source and the mobile station $54_1$ maintain the talk state.

In this talk state of a modification of this second embodiment, a message which indicates that the amount of information to be transmitted or received as a subsequent talk signal by the other party which is to connect with the mobile station $54_1$ decreases and also indicates the number of talk channels to be released depending on the decrease in the amount of information, for example, is notified to the switching station 53. In this case, the switching station 53 sends such a message to the radio control station 52 as a "channel reassign request" including the identifier, similarly to sending the "channel assign request" described above, as indicated by (a) in FIG. 14.

In addition, with respect to the above described talk channels, the radio control station 52 sends a "channel reassign response" to the switching station 53 as indicated by (b) in FIG. 14. The switching station 53 cooperates with the radio control station 52, the radio base station $51_1$ and the mobile station $54_1$, and releases the talk path corresponding to these talk channels as indicated by (c) through (g) in FIG. 14.

The series of processes described above in conjunction with FIG. 14 is realized by call management tables $61_E$ and $61_{MCS}$, the radio channel state table 71 and the call identifier table 81 which are the subject of the operations and the processes which are carried out with respect to the additional channels by the switching station 53, the radio control station 52, the radio base station $51_1$ and the mobile station $54_1$ in a reverse manner to the above described processes which are carried out to acquire the channels. Furthermore, the series of processes described above in conjunction with FIG. 14 is based on a procedure different from the series of operations described in conjunction with FIG. 13, in that the mobile station $54_1$ does not send a synchronizing signal but sends a "suspend notification" which indicates the suspension of the access with respect to the applicable additional channels, in place of the "synchronization complete notification".

According to this second embodiment and the modification thereof, it is possible to positively exchange the talk signal having a desired amount of information while appropriately modifying the transmission rate during service, based on the procedure indicated by (a) through (g) in FIGS. 13 and 14 which is basically the same as the procedure employed in the first embodiment described above.

Although it was described above that the opportunity of increasing or decreasing the amount of information of the talk signal is indicated from the other party of the mobile station $54_1$, that is, the calling source. However, the present invention is of course not limited to such, and as long as the radio transmission is positively made during service, for example, the opportunity may be indicated from the mobile station $54_1$.

As indicated by the dotted lines in FIGS. 13 and 14, the level is not measured with respect to candidates of the additional talk channels in the second embodiment and the modification thereof. However, if the utilization efficiency of the radio channels is within a tolerable range, it is possible to employ a procedure identical to that indicated by (10) through (14) in FIG. 6, for example, so as to measure the level with respect to the candidates.

Next, a description will be given of a first modification of the first embodiment described above. This first modification of the first embodiment is characterized by a processing procedure of the radio control station 52 which assigns the talk channels to each of the calls.

When the call having the mobile station $54_1$ as the called destination is generated as in the first embodiment and the "channel assign request" is sent from the switching station 53 in accordance with the procedure indicated by (1) through (9) in FIG. 6, The radio control station 52 makes a reference to the radio channel state table 71 at this point in time. By making this reference, the radio control station 52 successively obtains the number of time slots formed adjacent to each other in the order of the time-sequence for each of frequencies $f_1$ through $f_N$. The radio control station 52 also discriminates whether or not the number of time slots is greater than or equal to the number of talk channels which are to be assigned depending on the applicable "channel assign request". Furthermore, when the result of this discrimination is YES for any of the frequencies $f_1$ through $f_N$, the radio control station 52 carries out the processes of the first embodiment described above.

On the other hand, when the result of the discrimination is NO for all of the radio frequencies, the radio control station 52 obtains one of the frequencies $f_1$ through $f_N$ for which a difference between the number of time slots and the number of talk channels is a minimum, and temporarily acquires the adjacent time slots which correspond to the obtained frequency. For example, the adjacent time slots can be temporarily acquired by writing an identifier of a call which cannot exist in a corresponding region of the radio channel state table 71. It is possible to make the temporary acquisition of the adjacent time slots by other processes such as a process which modifies the construction of the radio channel state table 71.

In addition, with respect to the obtained frequency, the radio control station 52 obtains the identifiers of the calls to which a number of time slots adjacent to the adjacent time slots and equal to the difference is assigned. With respect to these calls, the radio control station 52 starts a process of forcibly switching the channel in service with respect to the radio channels formed by the free time slots of other frequencies. Various known procedures applicable to the mobile communication system, such as the mobile communication system applied with the present invention, is applicable to the processing procedure of the radio channel setup control which realizes this switching of the channel in service, and a description of such known procedures will be omitted in this specification.

When the radio control station 52 recognizes that the switching of all of the applicable channels in service is completed while carrying out the process of the radio channel setup control, the radio control station 52 assigns a plurality of radio channels which are formed by the time slots released depending on the switching of the channels in service and the temporarily acquired time slots, as desired talk channels. The operation of various parts of the radio communication system after the desired number of radio channels is secured is the same as that shown in FIG. 6, and a description thereof will be omitted in this specification.

Therefore, according to this first modification of the first embodiment, the talk channels which are assigned to the connection completed call in advance are positively assigned to the connection completed call that is generated thereafter, as long as replacement radio channels exist. As a result, it is possible to secure a transmission rate adapted to the amount of information of the talk signal of the connection completed call.

Of course, it is possible to similarly apply this first modification to the second embodiment described above.

Next, a description will be given of a second modification of the first embodiment described above. This second modification of the first embodiment is characterized by a processing procedure of the radio control station 52 which assigns the radio channels to each of the calls.

In this second modification of the first embodiment, a maximum value M of the number of radio channels that could possibly be assigned for each call generated in the mobile stations $54_1$ through $54_n$ is given to the radio control station 52 in advance.

In addition, when the call having the mobile station $54_1$ as the called destination is generated as in the first embodiment and the "channel assign request" is sent from the switching station 53 in accordance with the procedure indicated by (1) through (9) in FIG. 6, The radio control station 52 makes a reference to the radio channel state table 71 at this point in time. By making this reference, the radio control station 52 obtains one of the frequencies $f_1$ through $f_N$ for which the number of free time slots is greater than or equal to the maximum value M. The radio control station 52 also sets the free time slots of the obtained frequency as a limit of the talk channel assignment, with priority over the time slots of other frequencies, and makes the acquisition and assignment of the talk channels.

On the other hand, when the number of free time slots is less than the maximum value M for all of the radio frequencies $f_1$ through $f_N$, the radio control station 52 similarly sets the free time slots of the frequency for which the number of free time slots is small as the limit of the talk channel assignment, with priority over the time slots of other frequencies, and makes the acquisition and assignment of the talk channels.

According to this second modification of the first embodiment, when a call which requires the talk signal to be exchanged via a plurality of talk channels is generated, the probability of a desired number of radio channels being secured for the call is maintained high. In addition, even if the desired number of radio channels cannot be secured via any of the radio frequencies, it is possible to minimize the number of talk channels with respect to which the switching of the channel in service is to be started under the control similar to that of the first modification of the first embodiment described above.

In each of the embodiments and modifications described above, the timing at which the switching station 53 acquires the trunk corresponding to each radio channel is the time when the "channel assign response" is recognized. However, provided that an increase in the time required to acquire each trunk is tolerable and positive recognition is possible based on the call processing procedure, it is possible to acquire the trunk corresponding to each radio channel at an arbitrary timing prior to the time when the "channel assign response" is recognized, such as the time when the call is generated.

In addition, although the embodiments and the modifications were described for the radio communication system which is applied with the TDMA system as the multichannel access system for the radio lines, the present invention is of course not limited to the radio communication system employing the TDMA system. In other words, the present invention is applied to radio communication systems which employ other multi-channel access systems such as the CDMA and FDMA, as long as a plurality of radio channels can be generally assigned to a single call and each of the mobile stations can make access to these radio channels in parallel.

Furthermore, in each of the embodiments and the modifications, the message that is required for the received call with respect to the mobile station to become the connection completed call is exchanged via the representative line. However, the present invention is not limited to the use of such a message. For example, with respect to a disconnection which is to be made due to some cause prior to the received call becoming the connection completed call, it is possible to exchange via the representative line messages related to the termination of the connection completed call and the switching of the channel in service.

Moreover, although the switching station 53 and the radio control station 52 are independent units in the described embodiments and modifications, the construction of the mobile communication system according to the present invention is not limited to such a construction. For example, the present invention is similarly applicable to a mobile communication system in which the switching station 53 and the radio control station 52 are provided as a single unit.

In addition, although the radio control station 52 is coupled to the public network via the switching station 53, the construction of the mobile communication system according to the present invention is not limited to such a construction. For example, the present invention is similarly applicable to a mobile communication system in which the communication service is provided only among the mobile stations.

In each of the embodiments and the modifications, it is a precondition that the amount of information of the talk signal transmitted in parallel via the plurality of radio channels is the same for the up-line and the down-line. However, the present invention is not limited to the application to a radio communication system which forms such a full-duplex radio communication path. Provided that the amount of information is positively obtainable based on the radio channel setup control and call processing procedures, it is possible to form a radio transmission path having different communication capacities for the up-line and the down-line when the amount of information to be transmitted from the calling source to the called destination is large compared to the amount of information to be transmitted from the called destination to the calling source such as the case of a facsimile signal, for example.

Further, the present invention is not limited to these embodiments, but various variations and modifications may be made without departing from the scope of the present invention.

What is claimed is:

1. A radio communication system comprising:

a parent station forming a radio zone; and one or a plurality of child stations located within said radio zone, said parent station comprising:

assign means for discriminates a type of call based on a call processing procedure with respect to each call generated in said child stations, and out of radio channels forming said radio zone, making a general assignment of a number of free radio channels adapted to the discriminated type of call, based on a radio channel setup control procedure; and talk path setup means for setting up talk paths connecting said parent station with another party in parallel via the individual radio channels assigned by said assign means based on the call processing procedure, with respect to the individual calls, each of said child stations comprising:

completed call identifying means for exchanging a line signal with the other party via one representative channel out of the radio channels assigned by said assign means and the talk path which is set up by said talk path setup means in correspondence with the representative channel, and identifying a completed call of a child station to which said completed call identifying means belongs based on a line signal exchange procedure; and talk control means for sending or receiving a talk signal of the completed call which is identified by said completed call identifying means via all of the radio channels assigned by said assign means.

2. The radio communication system as claimed in claim 1, wherein said assign means comprises:

means for identifying a change in an amount of information of the talk signal with respect to the completed call based on the call processing procedure, and for successively making a general assignment of a number of radio channels proportional to an updated value of the amount of information depending on the identified change.

3. The radio communication system as claimed in claim 2, wherein said parent station further comprises:

radio channel manager means for storing each radio channel assigned by said assign means and the call to which each radio channel is assigned, in correspondence with each other, said assign means comprising means for searching a number of free radio channels depending on the type of call by referring to said radio channel manager means, with respect to a set of radio channels said child stations can send or receive the talk signal via said talk control means, and for starting switching of the channels in service with respect to the free radio channels belonging to another set, with respect to each of the calls stored in said radio channel manager means and corresponding to a shortage of the free radio channels.

4. The radio communication system as claimed in claim 1, wherein said parent station further comprises:

radio channel manager means for storing each radio channel assigned by said assign means and the call to which each radio channel is assigned, in correspondence with each other, said assign means comprising means for searching a number of free radio channels depending on the type of call by referring to said radio channel manager means, with respect to a set of radio channels said child stations can send or receive the talk signal via said talk control means, and for starting switching of the channels in service with respect to the free radio channels belonging to another set, with respect to each of the calls stored in said radio channel manager means and corresponding to a shortage of the free radio channels.

5. The radio communication system as claimed in claim 4, wherein said parent station comprises:

radio channel manager means for storing each radio channel assigned by said assign means and the call to which each radio channel is assigned, in correspondence with each other, said assign means comprising means for setting a limit of the assignment with priority to a number of free radio channels greater than or equal to a maximum number of radio channels which are to be assigned with respect to a single call, out of a set of radio channels said child stations can send or receive the talk signal via said talk control means.

6. The radio communication system as claimed in claim 1, wherein said parent station comprises:

radio channel manager means for storing each radio channel assigned by said assign means and the call to which each radio channel is assigned, in correspondence with each other, said assign means comprising means for setting a limit of the assignment with priority to a number of free radio channels greater than or equal to a maximum number of radio channels which are to be assigned with respect to a single call, out of a set of radio channels said child stations can send or receive the talk signal via said talk control means.

7. The radio communication system as claimed in claim 6, wherein said assign means comprises:

means for setting the limit of the assignment with priority to the free radio channels of a set having a small number of free radio channels when the number of free radio channels is smaller than the maximum number with respect to all sets of radio channels said child station can send or receive the talk signal via said talk control means.

8. A mobile station adapted to a radio communication system comprising a parent station forming a radio zone and one or a plurality of mobile stations located within said radio zone, said parent station comprising: assign means for discriminates a type of call based on a call processing procedure with respect to each call generated in said mobile stations, and out of radio channels forming said radio zone, making a general assignment of a number of free radio channels adapted to the discriminated type of call, based on a radio channel setup control procedure; and talk path setup means for setting up talk paths connecting said parent station with another party in parallel via the individual radio channels assigned by said assign means based on the call processing procedure, with respect to the individual calls, said mobile station comprising:

completed call identifying means for exchanging a line signal with the other party via one representative channel out of the radio channels assigned by said assign means and the talk path which is set up by said talk path setup means in correspondence with the representative channel, and identifying a completed call of a mobile station to which said completed call identifying means belongs based on a line signal exchange procedure; and talk control means for sending or receiving a talk signal of the completed call which is identified by said completed call identifying means via all of the radio channels assigned by said assign means.

* * * * *